(12) United States Patent
Coll et al.

(10) Patent No.: US 12,613,931 B2
(45) Date of Patent: Apr. 28, 2026

(54) ADAPTABLE EMBEDDED SEARCH ENGINE FUNCTIONALITY

(71) Applicant: Microsoft Technology Licensing, LLC, Redmond, WA (US)

(72) Inventors: Alicia Oliva Coll, Seattle, WA (US); Jose Miguel Rivera Davalos, Maple Valley, WA (US); Qiwen Guo, Redmond, WA (US); Raghu R Nadiminti, Bellevue, WA (US); Andreas Allern Brose, Troms (NO); Bjørnstein Lilleby, Troms (NO); Steffen Viken Valvåg, Troms (NO); Gordon Bradford Jensen, Tokyo (JP); Luke Roberts, Troms (NO); Soujanya Srivalli, Redmond, WA (US); Jon Meling, Troms (NO); Sheng Yi Chou, Troms (NO); Tracey Saur, Seattle, WA (US); Tudor Popa, Sibiu (RO); Mikael Svenson, Oslo (NO); Ajla Badza, Munich (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 131 days.

(21) Appl. No.: 18/336,381

(22) Filed: Jun. 16, 2023

(65) Prior Publication Data

US 2024/0419748 A1 Dec. 19, 2024

(51) Int. Cl.
G06F 16/9537 (2019.01)
G06F 16/9532 (2019.01)
G06F 16/955 (2019.01)

(52) U.S. Cl.
CPC ...... *G06F 16/9537* (2019.01); *G06F 16/9532* (2019.01); *G06F 16/955* (2019.01)

(58) Field of Classification Search
CPC .................................................. G06F 16/9537
(Continued)

(56) References Cited

U.S. PATENT DOCUMENTS

| 2013/0013634 | A1* | 1/2013 | Buchheit | ................ | G06Q 10/10 |
| | | | | | 707/769 |
| 2016/0078141 | A1* | 3/2016 | Fang | .................. | G06F 16/9535 |
| | | | | | 707/709 |

(Continued)

OTHER PUBLICATIONS

"React Router", Retrieved from: https://reactrouter.com/en/main, Retrieved Date: Feb. 19, 2023, 2 Pages.
(Continued)

*Primary Examiner* — Muluemebet Gurmu

(57) ABSTRACT

Systems and methods are provided for implementing adaptable embedded search engine functionality. In an aspect, a shared SERP system receives a user search query from a first search utility among a plurality of search utilities, which is associated with corresponding apps that are different from each other. A router of the shared SERP system provides the user search query and location information to a first query builder among one or more query builders of the shared SERP system. The first query builder constructs a query request corresponding to the user search query, based on the provided user search query and location information. A first query executor among one or more query executors of the shared SERP system executes the query request to produce search results. A component renderer of the shared SERP system renders one or more UX components within the first SERP, based on the search results.

20 Claims, 7 Drawing Sheets

(58) Field of Classification Search
USPC .......................................................... 707/724
See application file for complete search history.

(56) References Cited

U.S. PATENT DOCUMENTS

| | | | |
|---|---|---|---|
| 2016/0307121 A1* | 10/2016 | Volozh | G06F 16/248 |
| 2018/0260481 A1* | 9/2018 | Rathod | G06F 16/958 |
| 2018/0365580 A1* | 12/2018 | Musuvathi | G06N 20/00 |
| 2019/0272300 A1* | 9/2019 | Shetty | G06F 16/9535 |

OTHER PUBLICATIONS

"TanStack Query V3", Retrieved from: https://tanstack.com/query/v3/, Retrieved Date: Feb. 19, 2023, 8 Pages.

* cited by examiner

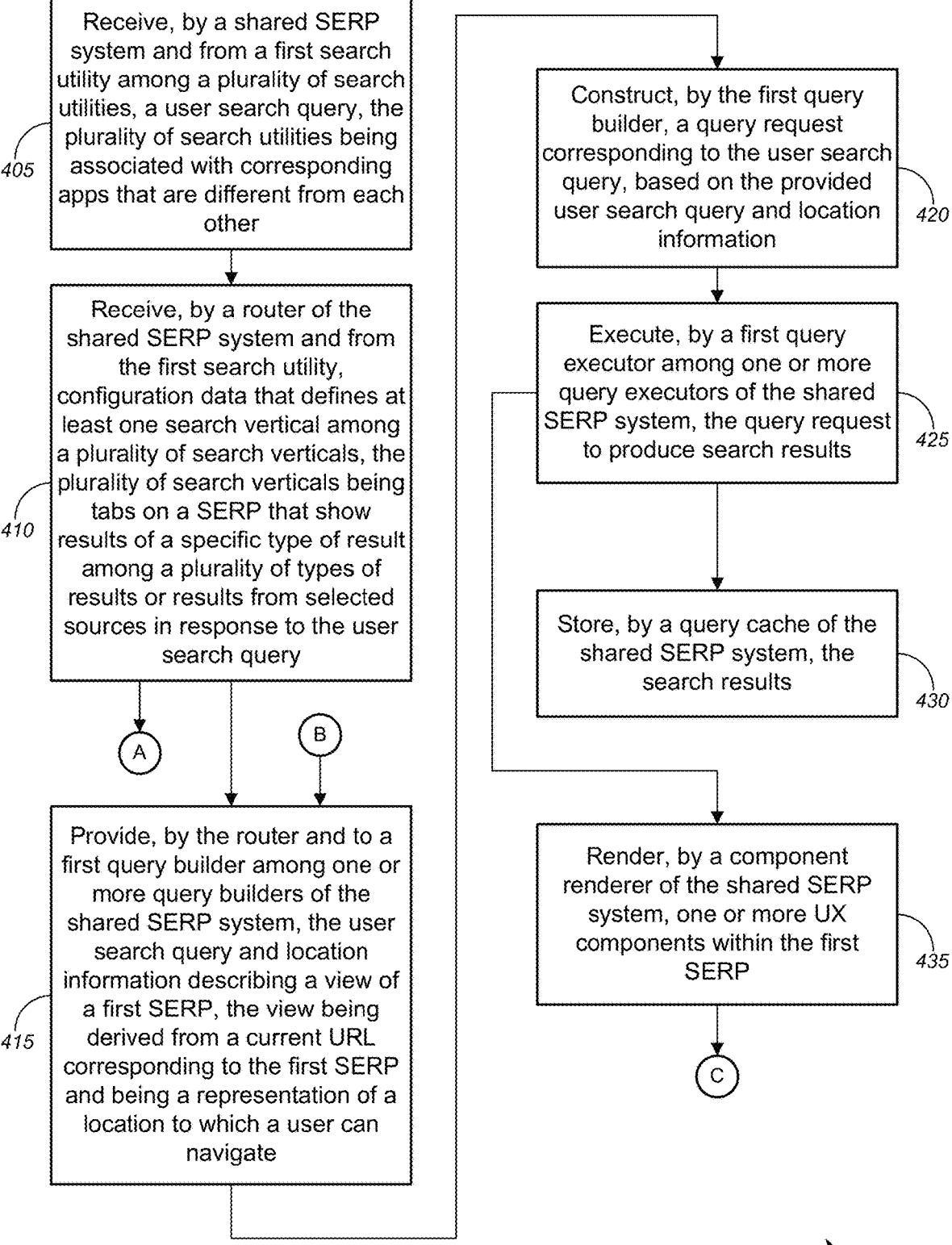

405 — Receive, by a shared SERP system and from a first search utility among a plurality of search utilities, a user search query, the plurality of search utilities being associated with corresponding apps that are different from each other 410 — Receive, by a router of the shared SERP system and from the first search utility, configuration data that defines at least one search vertical among a plurality of search verticals, the plurality of search verticals being tabs on a SERP that show results of a specific type of result among a plurality of types of results or results from selected sources in response to the user search query

A

B

415 — Provide, by the router and to a first query builder among one or more query builders of the shared SERP system, the user search query and location information describing a view of a first SERP, the view being derived from a current URL corresponding to the first SERP and being a representation of a location to which a user can navigate 420 — Construct, by the first query builder, a query request corresponding to the user search query, based on the provided user search query and location information 425 — Execute, by a first query executor among one or more query executors of the shared SERP system, the query request to produce search results 430 — Store, by a query cache of the shared SERP system, the search results 435 — Render, by a component renderer of the shared SERP system, one or more UX components within the first SERP

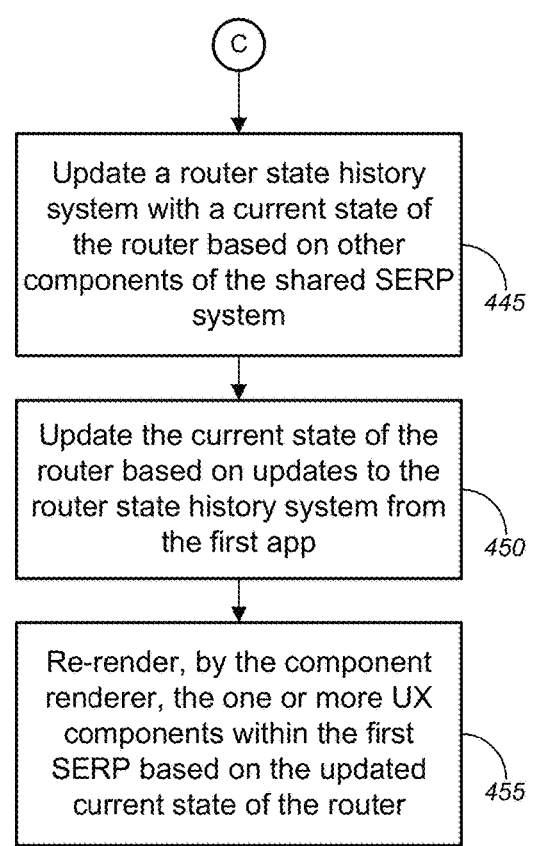

C

Update a router state history system with a current state of the router based on other components of the shared SERP system

445

Update the current state of the router based on updates to the router state history system from the first app

450

Re-render, by the component renderer, the one or more UX components within the first SERP based on the updated current state of the router

455

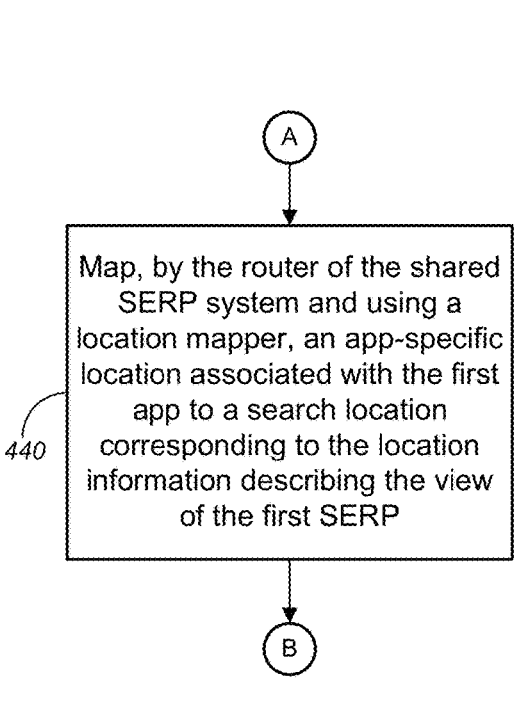

A

Map, by the router of the shared SERP system and using a location mapper, an app-specific location associated with the first app to a search location corresponding to the location information describing the view of the first SERP

Fig. 4C  — 400

ADAPTABLE EMBEDDED SEARCH ENGINE FUNCTIONALITY

BACKGROUND

For a software provider with multiple products oriented to various applications, multiple different and inconsistent search functions across the applications may result. In some cases, this means that there may be vastly different user experiences across the various applications when utilizing search functions. It is with respect to this general technical environment to which aspects of the present disclosure are directed. In addition, although relatively specific problems have been discussed, it should be understood that the examples should not be limited to solving the specific problems identified in the background.

SUMMARY

This summary is provided to introduce a selection of concepts in a simplified form that are further described below in the detailed description section. This summary is not intended to identify key features or essential features of the claimed subject matter, nor is it intended as an aid in determining the scope of the claimed subject matter.

The currently disclosed technology, among other things, provides a shared search engine results page ("SERP") system that establishes and/or maintains a consistent tenant-wide search experience across multiple products oriented to various applications. In examples, the shared SERP system receives a user search query from a first search utility among a plurality of search utilities. The plurality of search utilities is associated with corresponding software applications ("apps") or platforms that are different from each other. A router of the shared SERP system provides the user search query and location information to a first query builder among one or more query builders of the shared SERP system. The location information describes a view of a first SERP, the view being derived from a current uniform resource locator ("URL") corresponding to the first SERP and being a representation of a location to which a user can navigate. The first query builder constructs a query request corresponding to the user search query, based on the provided user search query and location information. A first query executor among one or more query executors of the shared SERP system executes the query request to produce search results. A component renderer of the shared SERP system renders one or more user experience ("UX") components within the first SERP, based on the search results.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

FIGS. 4A-4C depict an example method for implementing adaptable embedded search engine functionality.

DETAILED DESCRIPTION OF CERTAIN EMBODIMENTS

Figure 1:
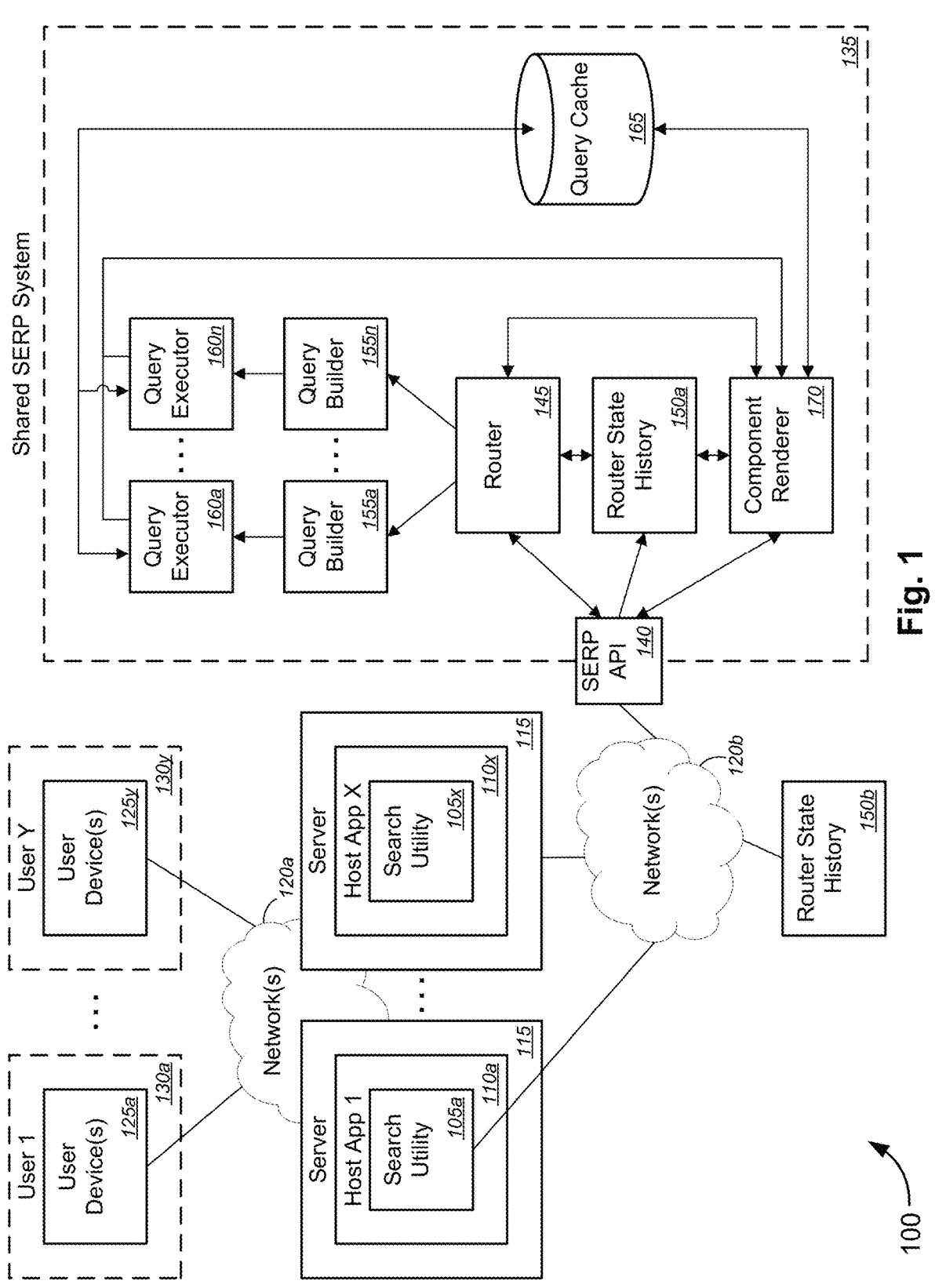
FIG. 1 depicts an example system for implementing adaptable embedded search engine functionality.

For a software provider with multiple products oriented to various applications, maintaining a consistent tenant-wide search experience across these applications has become a necessity to improve ease and efficiency in use of search functions using the various applications. Due to different backend calling and specific logic on UXs of the search functions using the various applications, the same queries lead to different results and order of the results on the various applications. This is attributed to calls for data that the various applications perform. In an example, one search utility associated with one of these applications may provide a clickable results title, a non-clickable breadcrumb or location, insights (e.g., including what was modified and modified how long ago), a description of documents, and snippets. Another search utility associated with another of these applications may provide a clickable results title, a clickable breadcrumb or location, insights (e.g., including what was modified and modified how long ago), a description of documents, snippets, and a clickable thumbnail previous on certain types of documents (e.g., word processing documents and/or presentation documents). The UXs may also differ in answer card formats and arrangements. In some cases, the UXs may provide different clicking behaviors. For example, clicking behavior for one search utility may open a separate tab, while clicking behavior for the other search utility may navigate to a location of the selected document.

In some examples, the UXs may also have different verticals scoped with different sets of content sources. For example, the scopes for one search utility may include All, People, Groups, Files, Sites, Conversation, Business Interactions, Costumed Verticals, News, and Video, while the verticals for the other search utility may include All, Files, Sites, People, News, Business Interactions, Video, and Costumed Verticals. From a UI perspective, the different search utilities may have different navigation placement of verticals or scopes. In an example, the verticals or scopes may be displayed on a left panel in one search utility and below a query box on the other search utility.

High precision and high confidence results may trigger based on queries and are presented on top of the page. Some answer types may have more than one result (e.g., acronyms, bookmarks). The results can be collapsed answer by answer. With more types of answers onboarding, several answers may be triggered together (e.g., bookmark+acronyms+question and answer). In an example, one search utility may show multiple types of answers that may be triggered together, while another search utility may show only one type of answer.

As briefly discussed above, a shared SERP system establishes and/or maintains a consistent tenant-wide search experience across multiple products oriented to various applications. The consistent tenant-wide search experience provides coherent search data and search UX in the SERPs across the multiple products oriented to various applications. In an example, the coherent search data and search UX in the SERPs also provides for better integration of work-based searches and web-based searches. The shared SERP system also enables coherence in terms of triggering, relevance, ranking, user flow, and content types.

In an example, the technical feature enables a web-based search utility or engine and an enterprise-based search utility or engine to be merged into a shared architecture that enables users to search web content and enterprise content from a common interface. This shared architecture provides a consistent UX for searching web and enterprise content and reduces the need from a user to switch between various applications or search utilities when searching for content.

The shared SERP system provides features including being productive, being readable (e.g., glanceable and scannable), being scalable, and being trustworthy. Being productive helps users reach their search goals faster. Being readable keeps the UX simple, where interactions and features focus attention by removing clutter and by organizing content. Being scalable, the system can expand to accommodate new features and content types. Being trustworthy, users can see the information they expect, and understand the source of the information and to where a click will navigate the user. In some embodiments, the shared SERP system or portions thereof (also referred to as search engine functionality) may be embedded within search utilities or search engines. In some examples, the shared SERP system provides for look and feel customization for UX experience across multiple search utilities while maintaining similar or same information architecture across the multiple search utilities.

Various modifications and additions can be made to the embodiments discussed without departing from the scope of the disclosed techniques. For example, while the embodiments described above refer to particular features, the scope of the disclosed techniques also includes embodiments having different combination of features and embodiments that do not include all of the above-described features.

We now turn to the embodiments as illustrated by the drawings. FIGS. 1-5 illustrate some of the features of a method, system, and apparatus for implementing adaptable embedded search engine functionality, and, more particularly, to methods, systems, and apparatuses for implementing adaptable embedded search engine functionality, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

FIG. 1 depicts an example system 100 for implementing adaptable embedded search engine functionality. System 100 includes one or more search utilities 105a-105x (collectively, "search utilities 105") that are associated with corresponding one or more host apps 110a-110x (collectively, "host apps 110"). The host apps 110 may each be hosted or operated on a server 115. The search utilities 105, the host apps 110, and/or servers 115 may communicatively couple, via one or more networks 120a, with one or more user devices 125a-125y (collectively, "user devices 125") associated with users 1 through Y 130a-130y (collectively, "users 130"). The search utilities 105, the host apps 110, and/or servers 115 may also communicatively couple, via one or more networks 120b, with a shared SERP system 135, via SERP application programming interface ("API") 140. In some cases, networks 120a and 120b may be the same network(s) or same group of networks. In other cases, networks 120a and 120b may be separate networks or separate groups of networks. Networks 120a and 120b (collectively, "network(s) 120") may each include at least one of a distributed computing network, such as the Internet, a private network, a commercial network, or a cloud network, and/or the like.

In some instances, the user devices 125 may each include one of a desktop computer, a laptop computer, a tablet computer, a smart phone, a mobile phone, or any suitable device capable of communicating with network(s) 120 or with servers or other network devices within network(s) 120. In some examples, the user devices 125 may each include any suitable device capable of communicating with at least one of the search utilities 105, the host apps 110, and/or the servers 115, and/or the like, via a communications interface. The communications interface may include an app-based portal (e.g., app UI hosted on server(s) 115) or a web-based portal, an API, a server, an app, or any other suitable communications interface (not shown), over network(s) 120. In some cases, users 130 may each include one of an individual, a group of individuals, or agent(s), representative(s), owner(s), and/or stakeholder(s), or the like, of any suitable entity. The entity may include a private company, a group of private companies, a public company, a group of public companies, an institution, a group of institutions, an association, a group of associations, a governmental agency, or a group of governmental agencies.

In some examples, the shared SERP system 135 may include a router 145, router state history 150a, one or more query builders 155a-155n (collectively, "query builders 155"), one or more query executors 160a-160n (collectively, "query executors 160"), query cache 165, and component renderer 170. In some cases, two or all of x, y, and n in the reference numerals for the search utilities 105a-105x, the host apps 110a-110x, the user devices 125a-125y, the users 130a-130y, the query builders 155a-155n, and the query executors 160a-160n may be of the same value or number. In other cases, each of n, x, and y may be of different values or numbers. In some cases, the router state history may be disposed external to, yet communicatively coupled to, the shared SERP system 135 via SERP API 140, e.g., as depicted by router state history 150b in FIG. 1.

In examples, the router 145 is configured to provide, to a first query builder 155a among one or more query builders 155, user search queries that are received from one or more search utilities among a plurality of search utilities 105a-105x and to provide location information describing a view of each of one or more SERPs, the view of each SERP being derived from a current URL corresponding to said each SERP and being a representation of a location to which a user (e.g., one of users 130a-130y) can navigate. In an example, a location is an object such as:

```
{
    searchText: "convergence",
    vertical: "files",
    page: 2,
    filters: { "fileType": "word" },
    siteScope: { siteId: "<guid>", siteIndexId: "<id>" }
}.
```

In this example, the location describes a view showing the Files vertical results for the "convergence" search text, on page 2, with a file type filter applied, scoped to a particular site. Locations are modelled as discriminated unions, with the vertical property as the discriminator, so the available properties on a location will depend on the value of the vertical property. Another location that describes a view within people centric search ("PCS") may be like the following:

```
{
    searchText: "convergence",
    vertical: "pcs-content",
    page: 1,
    personScope: { aadObjectId: "<guid>", name:
    "Steffen Viken Valvåg" }
}.
```

Each query builder 155 is configured to construct query requests corresponding to the user search queries, based on the corresponding provided user search queries and location information. In an example, given a location, a query builder can construct a query request that can be sent to fetch data for the view. Query builders also have access to a conversation identifier ("ID") and logical ID to be used for instrumentation for a user-specific enterprise information access source (e.g., 3S instrumentation), so they can incorporate these IDs into the request as appropriate. Each query executor 160 is configured to execute the query requests to produce search results and/or configured to retrieve search results from query cache 165. The query cache 165 is configured to store the search results, and configured to serve a plurality of different query types (e.g., 3S queries and/or search configuration queries). In some examples, each query type is associated with a corresponding query builder among the one or more query builders 155a-155n and with a corresponding query executor among the one or more query executors 160a-160n. In some examples, the query cache 165 is further configured to caches a status of ongoing or completed queries, and has an associated a "use query" hook, which components can use to access the search results. In some cases, the query cache 165 is further configured to prefetch queries. In this manner, a query can be populated into the query cache without mounting any components.

In examples, each query executor 160 and the query cache 165 are configured to access, or be accessed by, a tenant-wide information system within a computing environment. In some examples, the shared SERP system 135 is configured to provide a consistent and coherent search experience across the plurality of search utilities 105a-105x for the tenant-wide information system, by conforming at least one of UX components, UX component layouts, metadata, or user flows when rendering UX components in SERPs for the plurality of search utilities for the tenant-wide information system. The component renderer 170 is configured to render one or more UX components within the first SERP, based on the search results and at least one of a current state of the router or one or more navigable links to other locations related to the search results.

Figure 2:
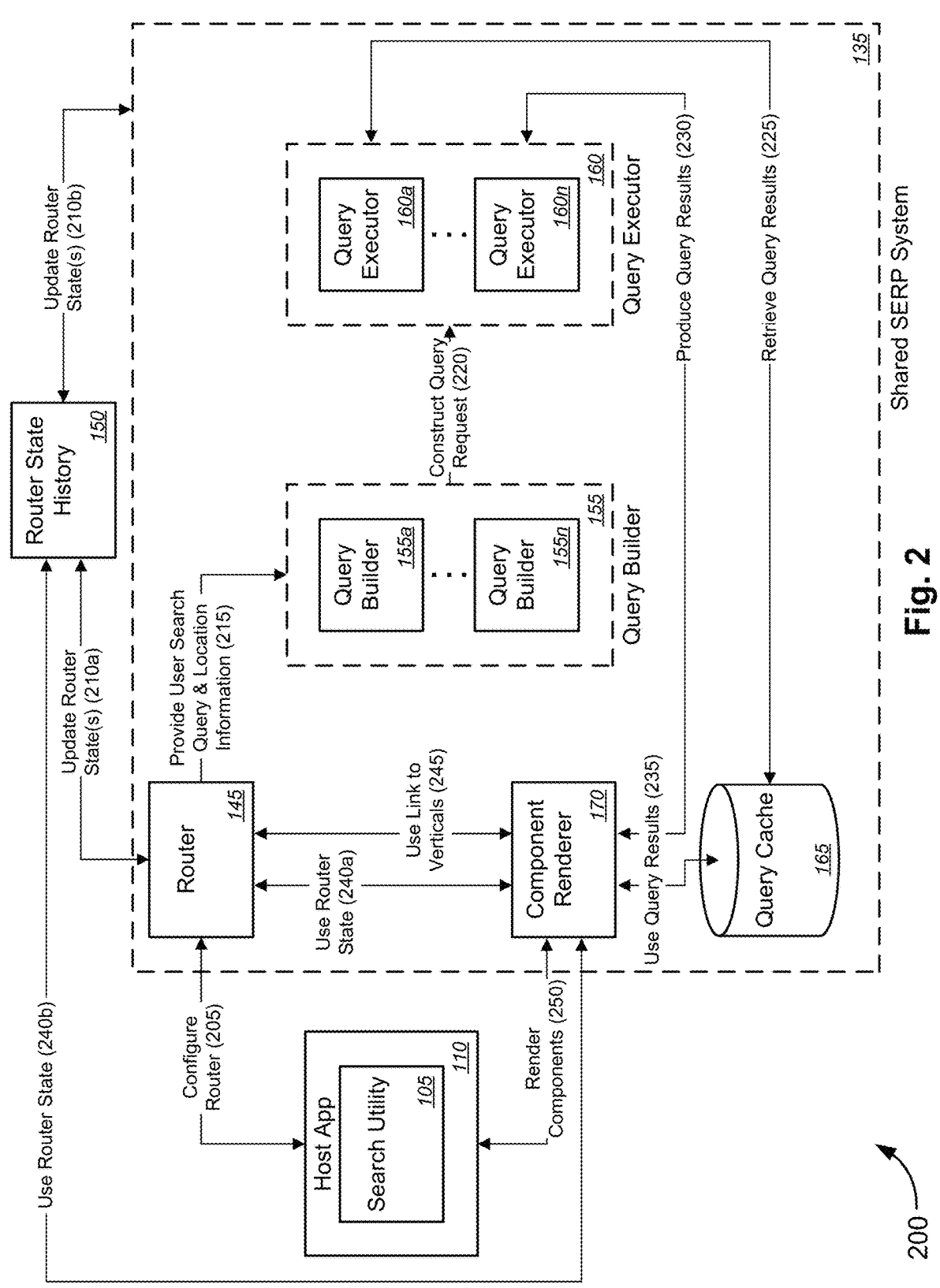
FIG. 2 depicts a block diagram illustrating an example data flow for implementing adaptable embedded search engine functionality.
Figure 3A:
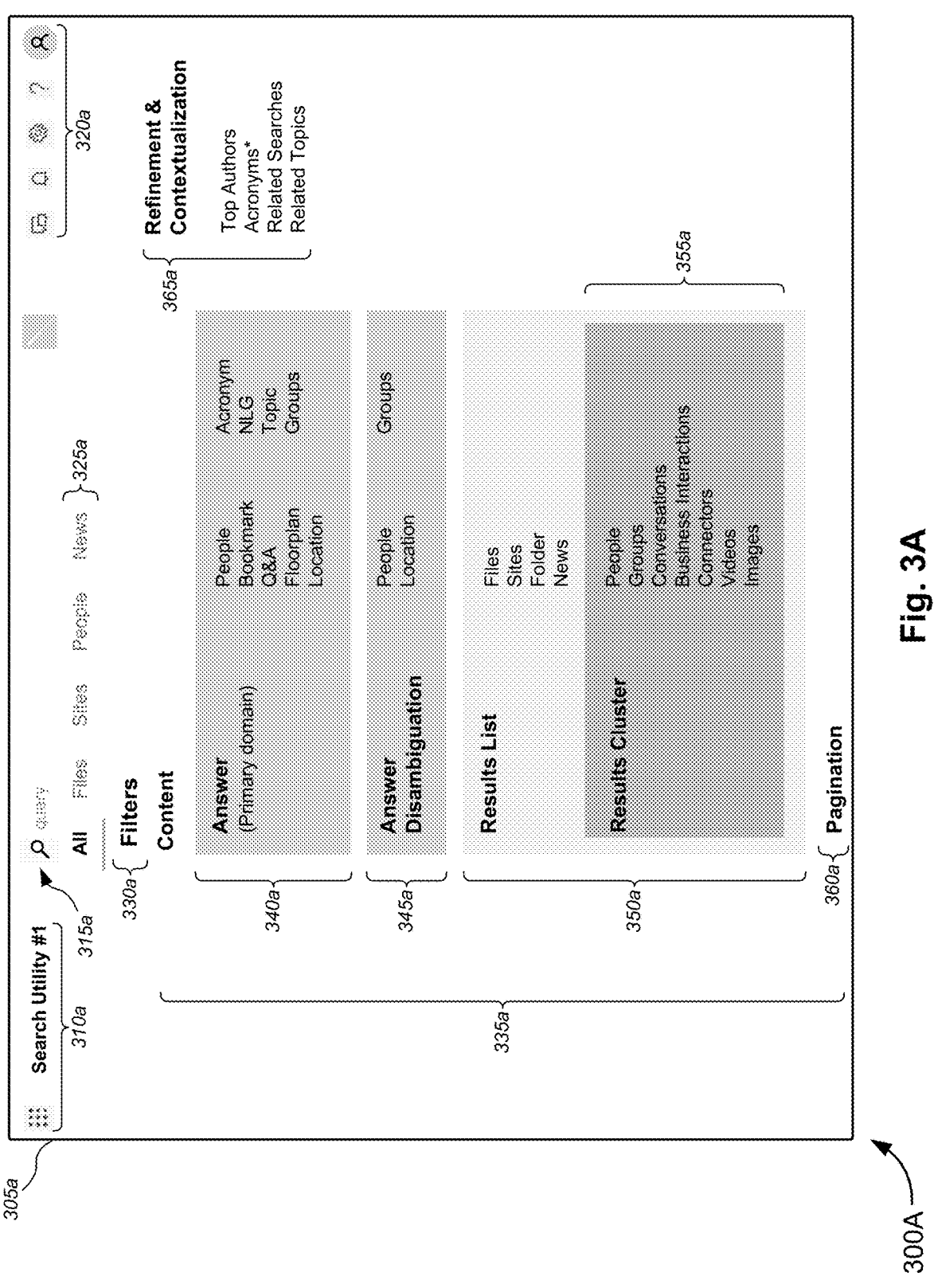
FIGS. 3A and 3B depict diagrams illustrating example UXs for different search utilities of corresponding host apps when implementing adaptable embedded search engine functionality.
Figure 3B:
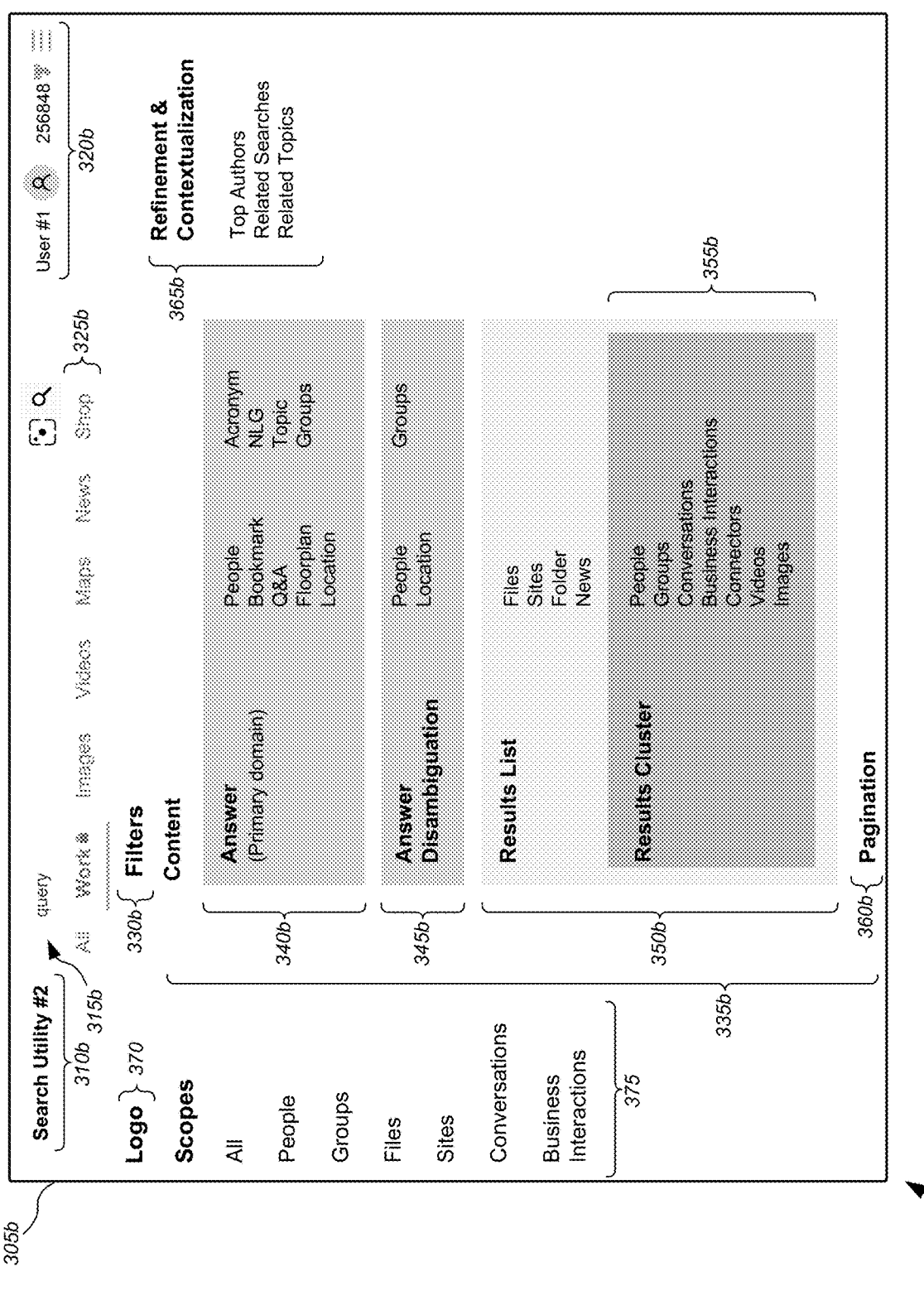

In operation, the server(s) 115 and/or shared SERP system 135 (collectively, "computing system") may perform methods for implementing adaptable embedded search engine functionality, as described in detail with respect to FIGS. 2-4. For example, the following functionalities may be applied with respect to the operations of system 100 of FIG. 1. FIG. 2 as described below are directed to an example data flow 200 associated with implementing adaptable embedded search engine functionality using a shared SERP system. FIGS. 3A and 3B as described below are directed to an example user experiences 300A and 300B illustrating converged and shared SERPs including consistent UIs or UX components with minor differences depending on the search utilities when implementing adaptable embedded search engine functionality. FIGS. 4A-4C as described below are directed to the method for implementing adaptable embedded search engine functionality using a shared SERP system.

FIG. 2 depicts a block diagram illustrating an example data flow 200 for implementing adaptable embedded search engine functionality. In some embodiments, search utility 105, host app 110, shared SERP system 135, router 145, router state history 150, query builders 155 and 155a-155n, query executors 160 and 160a-160n, query cache 165, and component renderer 170 of FIG. 2 may be similar, if not identical, to the search utilities 105a-105x, host apps 110a-110x, shared SERP system 135, router 145, router state history 150a or 150b, query builders 155a-155n, query executors 160a-160n, query cache 165, and component renderer 170, respectively, of system 100 of FIG. 1, and the description of these components of system 100 of FIG. 1 are similarly applicable to the corresponding components of FIG. 2.

With reference to the example data flow 200 of FIG. 2, at operation 205, host app 110 configures router 145 of shared SERP system 135 by sending configuration data to the router 145. The configuration data defines at least one search vertical among a plurality of search verticals. A vertical, as used herein, refers to a focused view of a content type that has a tab in the menu navigation. A vertical allows users to narrow down the focus results sets. Content from a vertical or scope can be included, but does not need to be in an "All" vertical or scope (e.g., $3^{rd}$ party content). In an example, the plurality of search verticals includes tabs on a SERP that show results of a specific type of result among a plurality of types of results or results from selected sources in response to the user search query. In examples, based on high triggered intent, a relevant vertical is reordered to a second place in a vertical order to promote the content. In an example, when a vertical is re-ordered, the results on that vertical is pre-fetched to ensure a good UX.

At operation 210, the current state of the router 145 as stored in router state history 150 (e.g., React Router® library used to handle client and server-side routing) may be updated based on the current state of the router 145 as obtained from the router 145 itself (at operation 210a) and/or based on other components of the shared SERP system 135 (at operation 210b).

At operation 215, the router 145 provides the user search query and location information to a first query builder 155 among one or more query builders 155a-155n of the shared SERP system 135. The location information describes a view of a first SERP, the view being derived from a current URL corresponding to the first SERP and being a representation of a location to which a user can navigate. In an example, the router 145 maintains the current location and determines which other locations are available. For example, the router 145 determines which verticals are available and which filters and refiners can be applied in each vertical, including custom verticals and refiners. In some examples, router 145 is flexible enough to work with the following: host apps 110 using react-router based navigation and history management; host apps 110 that do not use react-router based history or navigation but have their own way (e.g., "Commanding" in Microsoft Teams®); host apps 110 where search is a standalone experience without communication back to the host app regarding history or navigation. In examples, router 145 makes use of a generic object of a search location mapper type. Each host app 110 implements its own version of search location mapper and passes it to router 145 while initializing. The following methods may be implemented per host app requirement:

getInitialLocation( ): SearchLocation;
toSearchLocation(location: T): SearchLocation;
from SearchLocation(location: SearchLocation): T;
getHrefForLocation(location: SearchLocation): string.

Here, T is host app specific. For example, for one host app, T may be react-router location. For another host app, T may be a command-based location supplied by the host app. The search location mapper defines how a per-host-app app-specific location can be converted to search location, and vice versa. The search location mapper allows further flexibility for host apps with similar kinds of history management but different URL scheme. For example, some search utilities might support browser-based history, but have different URL parameters or schemes to define a history location. Separating a conversion logic to app-specific location mappers and having a router that is generic enough allows the router to be agnostic of underlying mechanisms and to work without any other change required.

In some embodiments, the host app may support react-router functionality or a browser-based history. In examples, an integration code initializes a location mapper to handle react-router based history and to pass the history on to create a search router. In some examples, a search router connector component may be used to host business logic for subscribing to router state history 150. The business logic also subscribes to search router state changes and determines whether to update react-router history or not. This logic is separated out of the search router, resulting in the router being independent of any specific history type. The search router connector may be used in integration code when the host app supports router state history 150. In some examples, the connection is a two-way binding where updates to the react-router history that are coming from the host app will be reflected in the router state, and updates to the router state that are coming from internal SERP components are reflected in the router state history 150. Browser navigation backward or forward may be monitored or tracked by router state history 150 and may correspondingly update the history object, which in turn updates the router state and causes UX components to re-render. Programmatic navigation on the SERP, such as pagination, may update the router state, which in turn updates the router state history 150, and react-router will then update the URL in the browser's address bar.

According to some embodiments, the host app may support custom command-based history. In examples, an integration code initializes a location mapper to handle host app-specific history and to pass the history on to create a search router. Although no router connector component is used, the following may be used for two-way binding. A location mapper to search location may be used to convert specific location history to search location and the location may be used to update a router state using a set location method. This may in turn update the corresponding components. As for the component to host app communication, the host app may provide a call-back (e.g., "afterNavigationCallBack") through router configuration or "Façade." This may be called by the component whenever a navigation occurs using verticals or filters (e.g., "SearchLink.go( )"). In some examples, navigation to a location may implicitly trigger queries for that location, before updating any router-connected components about the new location. This ensures that the queries are started as soon as possible before any main thread cycles are spent on unmounting and mounting components for the new view. When a component renderer renders results, it uses the "useQuery" hook, and the location is implicit, so there is no room for mistake. The router can anticipate exactly which queries should be started for a location.

At operation 220, the first query builder 155 constructs a query request corresponding to the user search query, based on the provided user search query and location information. A first query executor 160 among one or more query executor 160a-160n of the shared SERP system 135 executes the query request. At operation 225, the first query executor 160 executes the query request by, based on a determination that the query cache 165 already has stored thereon the query results corresponding to the user search query, retrieving query results 225 from query cache 165. Alternatively, at operation 230, the first query executor 160 executes the query request to produce the query results (230).

At operation 250, the component renderer 170 renders one or more UX components within the first SERP, by using at least one of the query results (at operation 235) either retrieved from query cache 165 (at operation 225) or produced by the first query executor 160 (at operation 230), the router state either from the router 145 itself (at operation 240a) and/or the router state history 150 (at operation 240b), a link to verticals from router 145 (at operation 245). In an example, when a component renderer 170 is used to access results of the user search query, the component renderer 170 passes the query type of interest into the "useQuery" hook, but not the current location. The current location is automatically factored in by the "useQuery" implementation. This eliminates a class of bugs where the component ends up querying for something that was not anticipated properly when routing to the location. In some examples, component renderer 170 uses hooks like "useLinkToVertical" to obtain "SearchLink" objects that can be used for navigation to other locations. A SearchLink has a "go( ) property" that can be used to navigate programmatically, for example, in click handlers, and a "href property" that contains the URL to the location, to be used for rendering anchors that can be opened in new tabs. The "go( ) property" can also be used for navigation initiated from the host app integration code, notably for submitting a search coming from the search box. In some examples, the rendered UX components are presented or displayed within the UX of the search utility, such as shown in FIG. 3A or 3B.

In some examples, the UX components may include the search results or answers. A search result or an answer, as used herein, is a direct fulfillment of a search intent associated with the user search query. The search result or answer allows quick access to needed or requested information and/or quick access to an action(s) that allows the user to remain in a flow. In some examples, search results or answers can be promoted to high precision or high confidence results —e.g., top results. In an example, the search results or answers are place at a top of the page, above other results in a SERP. In some examples, the shared SERP system provides for UX components that are modular in terms of which UX components are displayed and/or the manner in which the UX components are displayed or presented within the UX. In examples, a component state that is not reflected in the location will not survive refreshing the page. For rich results like answers or an embedded card, there may be navigation within the result component. This navigation state will remain in the component and is not reflected in locations or in the router state, so the component will reset to its initial state if the page is reloaded. In some examples, the shared SERP provides support for verticals in two ways. The first way involves standard verticals, which follow a typical pattern of a single 3S call and rendering the response, including answers, in a list. The "All" vertical is an example of this. The second way involves non-standard verticals, which may leverage the underlying functionality of the standard vertical, such as filtering, data fetching, rendering, and pagination. The shared SERP, however, need not use any or all of these, and, in some cases, custom functionality may be used as well. The "Images" vertical is an example of this, which fetches 3S results in the typical way, but results are rendered in a highly specialized visual manner.

FIGS. 3A and 3B depict diagrams illustrating example UXs 300A and 300B for different search utilities of corresponding host apps when implementing adaptable embedded search engine functionality. In example UXs 300A and 300B of corresponding FIGS. 3A and 3B, for simplicity of illustration, categories of search results are shown to represent actual or normally displayed search results. Although the example UXs 300A and 300B are associated with different search utilities of corresponding host apps, by implementing the adaptable embedded search engine functionality using a shared SERP system (e.g., the shared SERP system 135 of FIG. 1 or 2), the search results are rendered in a converged and shared SERP including consistent UIs or UX components with minor differences depending on the search utilities.

In the non-limiting example UX 300A of FIG. 3A, UI 305a includes a header portion 310a, a search field 315a, a user option portion 320a, a search vertical list portion 325a, a filter portion 330a, and a search result display field 335a. In an example, the search results display field 335a may include an answer display field 340a, an answer disambiguation display field 345a, a results list display field 350a, a results cluster display field 355a, pagination 360a, and/or refinement and contextualization display field 365a.

In some examples, the UI 305a is associated with a first search utility of the first host app (e.g., search utility 105a of host app 110a of FIG. 1). In an example, header portion 310a displays a name and/or logo of the first search utility, e.g., as shown in FIG. 3A. The search field 315a provides an input field for receiving a user search query. The user option portion 320a may include options, buttons, or interactive icons corresponding to functions or features including a messaging function, a notification function, a settings function, a help function, and a user account function. After processing the user search query, the shared SERP system (e.g., shared SERP system 135) may output and render the search results in the search result display field 335a.

The search results in the search result display field 335a may be filtered by selection of search verticals 325a, which may include at least one of All, Files, Sites, People, and/or News. Selection of filters 330a may further filter the search results, e.g., by narrowing down results on the page based on filter type. In some examples, the filter types include time range (e.g., all time ranges, past 24 hours, past week, past month, past year, and custom date range), location, and/or file type. Selection of the "All" search vertical filters the search results to display all the search results within the search result display field 335a. Selection of the "Files" search vertical filters the search results to display files or documents among the search results (or links to the files or documents) within the search result display field 335a. In some examples, the files or documents may include at least one of word processing documents, spreadsheet documents, presentation documents, note-taking documents, document format files, image files, video files, website documents, and/or news documents. Selection of the "Sites" search vertical filters the search results to display websites among the search results (or links to the websites) within the search result display field 335a. Selection of the "People" search vertical filters the search results to display a list of people among the search results (or links to information associated with the people in the list) within the search result display field 335a. Selection of the "News" search vertical filters the search results to display news articles among the search results (or links to the news articles) within the search result display field 335a.

In some examples, within the answer display field 340a (also referred to as a primary domain), the search results include at least one of people, bookmarks, questions and answers ("Q&A"), floorplans, locations, acronyms, natural language generated ("NLG") responses, topics, and/or groups. In examples, within the answer disambiguation display field 345a, the search results include at least one of people, locations, and/or groups. In the case that various answers of people, locations, or groups result from the search, in the answer disambiguation display field 345a, the various answers with top high confidence results or most relevant results may be listed. In some examples, within the results list display field 350a, the search results include at least one of files, sites, folders, and/or news. In examples, the results list display field 350a include the results cluster display field 355a. In some examples, the results cluster display field 355a include at least one of people, groups conversations, business interactions, connectors, videos, and/or images. A results cluster, as used herein, refers to a group of results in the same domain or content that have high, medium, or low relevance to a user search query, but not merge ranked with the rest of the result list. In an example, a results cluster is a floating field positioned on the "All" vertical, based on whole page relevance arbitration. In some examples, a results cluster has a dedicated domain or content that can be up-scoped to see more results of that content type. In some cases, relevant results in the same results cluster have similar confidence amongst each other in a domain. In some instances, a results cluster can be used for both first and third party content. In an example, an initial wave of first party content may include video, image, business interactions, and conversations. In some examples, UX affordance of a results cluster can be varied based on content type and level of relevance. In some cases, the results cluster shows top two or three relevant results. If the number of search results exceeds a default number or a selected number of results per page, then pagination 360a divides and distributes the search results across multiple pages. In examples, within the refinement and contextualization display field 365a, related results are displayed, the related results including at least one of top authors, acronyms, related searches, and/or related topics. Top authors may be based on the presented file search result in a mainline search field. Related searches may be based on the user search query. Related topics may be based on the search results.

In the non-limiting example UX 300B of FIG. 3B, UI 305b includes a header portion 310b, a search field 315b, a user option portion 320b, a search vertical list portion 325b, a filter portion 330b, and a search result display field 335b. In an example, the search results display field 335b may include an answer display field 340b, an answer disambiguation display field 345b, a results list display field 350b, a results cluster display field 355b, pagination 360b, refinement and contextualization display field 365*b*, a logo portion 370, and/or a scopes list portion 375.

In some examples, the UI 305*b* is associated with a second search utility of the second host app (e.g., search utility 105*a* of host app 110*a* of FIG. 1). In an example, header portion 310*b* displays a name of the second search utility, e.g., as shown in FIG. 3B. The search field 315*b* provides an input field for receiving a user search query, which may include text-based search query input field and/or image-based search query input field. In an example, the user option portion 320*b* may include a user account function, a user reward point function, and a menu function. After processing the user search query, the shared SERP system (e.g., shared SERP system 135) may output and render the search results in the search result display field 335*b*.

The search results in the search result display field 335*b* may be filtered by selection of search verticals 325*b*, which may include at least one of All, Work, Images, Videos, Maps, News, and/or Shop. Selection of filters 330*b* may further filter the search results in a similar manner as selection of filers 330*a* as described above. Selection of the "All" search vertical filters the search results to display all the search results within the search result display field 335*b*. Selection of the "Work" search vertical filters the search results to display work-related files or documents among the search results (or links to the work-related files or documents) within the search result display field 335*b*. In some cases, the work-related files or documents may be encrypted or otherwise secured from access by unauthorized entities. Selection of the "Images" search vertical filters the search results to display images among the search results (or links to the images) within the search result display field 335*b*. Selection of the "Videos" search vertical filters the search results to display videos among the search results (or links to the videos) within the search result display field 335*b*. Selection of the "Maps" search vertical filters the search results to display maps among the search results (or links to the maps) within the search result display field 335*b*. Selection of the "News" search vertical filters the search results to display news articles among the search results (or links to the news articles) within the search result display field 335*b*. Selection of the "Shop" search vertical filters the search results to display shop-based results, product-based results, or service-based results among the search results (or links to the shop-based results, product-based results, or service-based results) within the search result display field 335*b*.

The format and layout of the search result display field 335*b* (including the answer display field 340*b*, the answer disambiguation display field 345*b*, the results list display field 350*b*, and the results cluster display field 355*b*), pagination 360*b*, and the refinement and contextualization display field 365*b* are otherwise similar to, or identical to, the search result display field 335*a*, pagination 360*a*, and the refinement and contextualization display field 365*a*, respectively, of UX 300A of FIG. 3A. In some examples, the refinement and contextualization display field 365*b* may differ from the refinement and contextualization display field 365*a* in that the related results of the refinement and contextualization display field 365*b* may exclude acronyms. In examples, the logo portion 370 displays a logo of the second search utility, e.g., as shown in FIG. 3B.

In some examples, the scopes list portion 375 includes scopes including at least one of All, People, Groups, Files, Sites, Conversations, and/or Business Interactions. The scopes 375 may be similar to the search verticals 325*a* of UX 300A of FIG. 3A. In some examples, selection of the "All" scope filters the search results to display all the search results within the search result display field 335*b*. Selection of the "People" scope filters the search results to display a list of people among the search results (or links to information associated with the people in the list) within the search result display field 335*b*. Selection of the "Groups" scope filters the search results to display groups among the search results (or links to the groups) within the search result display field 335*b*. Selection of the "Files" scope filters the search results to display files or documents among the search results (or links to the files or documents) within the search result display field 335*b*. In some examples, the files or documents may include at least one of word processing documents, spreadsheet documents, presentation documents, note-taking documents, document format files, image files, video files, website documents, and/or news documents. Selection of the "Sites" scope filters the search results to display websites among the search results (or links to the websites) within the search result display field 335*b*. Selection of the "conversations" scope filters the search results to display conversations among the search results (or links to the conversations) within the search result display field 335*b*. Selection of the "business interactions" scope filters the search results to display business interactions among the search results (or links to the business interactions) within the search result display field 335*b*.

FIGS. 4A-4C depict an example method 400 for implementing adaptable embedded search engine functionality. Method 400 of FIG. 4A continues onto FIG. 4B following the circular marker denoted, "A," and returns to FIG. 4A following the circular marker denoted, "B." Method 400 of FIG. 4A continues onto FIG. 4C following the circular marker denoted, "C."

At operation 405, a shared SERP system may receive a user search query from a first search utility among a plurality of search utilities. The plurality of search utilities being associated with corresponding apps or platforms that are different from each other. The first search utility may receive the user search query from a user device (e.g., one of user devices 125*a*-125*n* of FIG. 1). In some examples, receiving the user search query (at operation 405) may include receiving, by the shared SERP system and from the first search utility, the user search query via an API between the shared SERP system and a first app corresponding to the first search utility.

At operation 410, a router of the shared SERP system may receive configuration data from the first search utility. The configuration data defines at least one search vertical among a plurality of search verticals. In some examples, the plurality of search verticals includes tabs on a SERP that show results of a specific type of result among a plurality of types of results or results from selected sources in response to the user search query. Method 400 either may continue onto the process at operation 415 or may continue onto the process at operation 440 in FIG. 4B, following the circular marker denoted, "A."

At block 440 in FIG. 4B (following the circular marker denoted, "A," in FIG. 4A), method 400 may include mapping, by the router of the shared SERP system and using a location mapper, an app-specific location associated with the first app to a search location corresponding to the location information describing the view of the first SERP. Method 400 may return to the process at block 415 in FIG. 4A following the circular marker denoted, "B."

At operation 415, the router may provide the user search query and location information to a first query builder among one or more query builders of the shared SERP system. The location information describes a view of a first SERP, the view being derived from a current URL corresponding to the first SERP and being a representation of a location to which a user can navigate.

At operation 420, the first query builder may construct a query request corresponding to the user search query, based on the provided user search query and location information. In some examples, the query request further incorporates at least one of a conversation ID or a logical ID each of which is accessible by the query builder. The conversation ID is used to identify a conversation containing a set of search queries in a session. The logical ID is used to identify a logical category by which the at least one search vertical is created.

At operation 425, a first query executor among one or more query executors of the shared SERP system may execute the query request to produce search results. At operation 430, a query cache of the shared SERP system may store the search results. In some examples, the query executor and the query cache are configured to access, or be accessed by, a tenant-wide information system within a computing environment. In some embodiments, the shared SERP system is configured to provide a consistent and coherent search experience across the plurality of search utilities for the tenant-wide information system, by conforming at least one of UX components, UX component layouts, metadata, or user flows when rendering UX components in SERPs for the plurality of search utilities for the tenant-wide information system.

At operation 435, a component renderer of the shared SERP system may render one or more UX components within the first SERP, based on the search results and, in some cases, at least one of a current state of the router or one or more navigable links to other locations related to the search results. In some examples, rendering the one or more UX components within the first SERP may include rendering a mainline region, pagination, and a context region, the mainline displaying the search results, pagination displaying the search results across multiple pages, and the context region displaying at least one of content related to the search results or one or more search verticals among the plurality of search verticals. In examples, rendering the one or more UX components within the first SERP may further include rendering a results cluster region that displays a collection of information associated with the search results, the collection of information being displayed in one or more forms. According to some embodiments, the shared SERP system is configured to be embeddable within each of the plurality of apps and to adapt to UX components of an app within which it is embedded. Method 400 may continue onto the process at operation 445 in FIG. 4C, following the circular marker denoted, "C."

At block 445 in FIG. 4C (following the circular marker denoted, "C," in FIG. 4A), method 400 may include updating a router state history system with a current state of the router based on other components of the shared SERP system. Method 400 may further include updating the current state of the router based on updates to the router state history system from the first app (at operation 450); and re-rendering, by the component renderer, the one or more UX components within the first SERP based on the updated current state of the router (at operation 455).

While the techniques and procedures in method 400 are depicted and/or described in a certain order for purposes of illustration, it should be appreciated that certain procedures may be reordered and/or omitted within the scope of various embodiments. Moreover, while the method 400 may be implemented by or with (and, in some cases, are described below with respect to) the systems, examples, or embodiments 100, 200, 300A, and 300B of FIGS. 1, 2, 3A, and 3B, respectively (or components thereof), such methods may also be implemented using any suitable hardware (or software) implementation. Similarly, while each of the systems, examples, or embodiments 100, 200, 300A, and 300B of FIGS. 1, 2, 3A, and 3B, respectively (or components thereof), can operate according to the method 400 (e.g., by executing instructions embodied on a computer readable medium), the systems, examples, or embodiments 100, 200, 300A, and 300B of FIGS. 1, 2, 3A, and 3B can each also operate according to other modes of operation and/or perform other suitable procedures.

Figure 5:
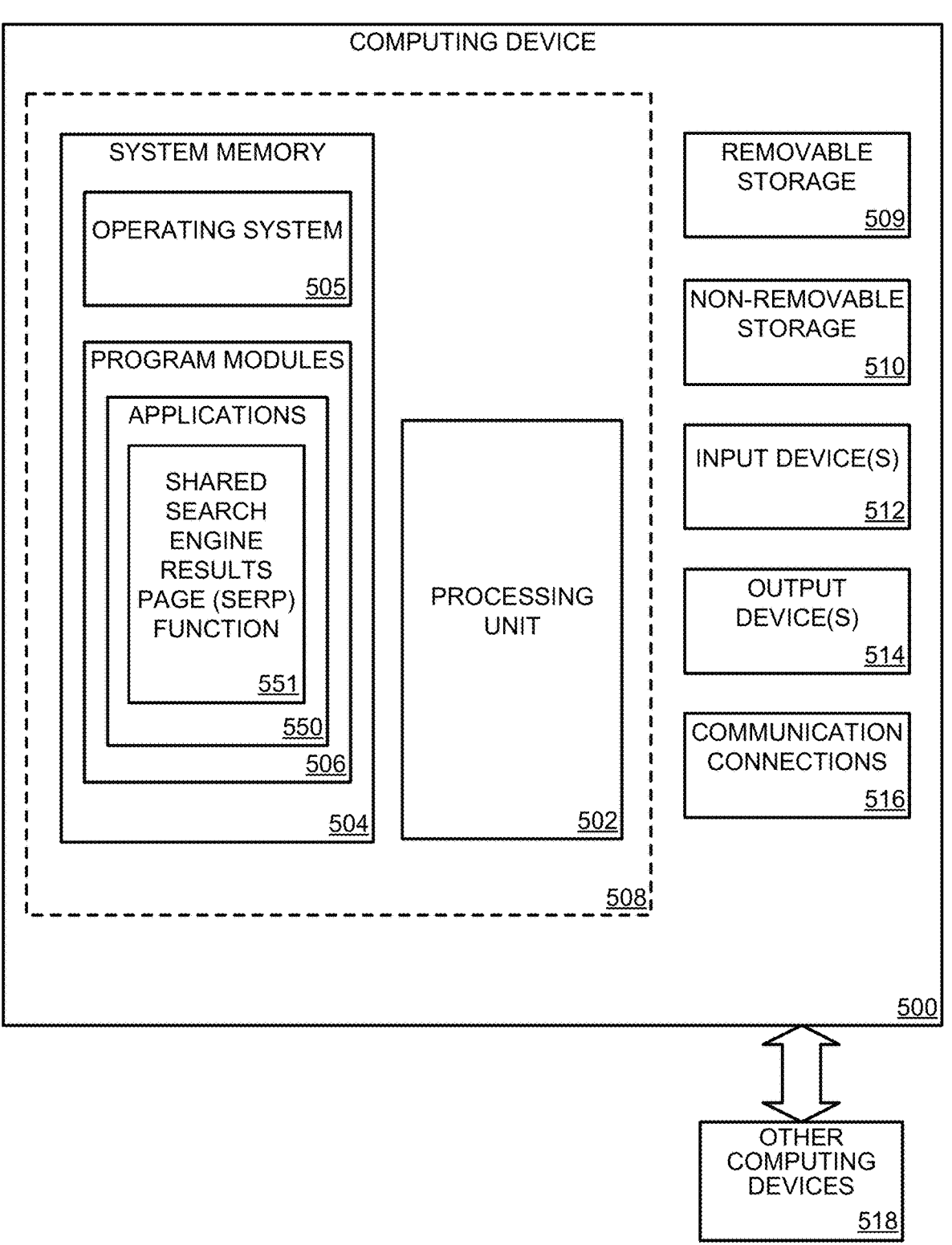
FIG. 5 depict a block diagram illustrating example physical components of a computing device with which aspects of the technology may be practiced.

FIG. 5 depicts a block diagram illustrating physical components (i.e., hardware) of a computing device 500 with which examples of the present disclosure may be practiced. The computing device components described below may be suitable for a client device implementing the adaptable embedded search engine functionality, as discussed above. In a basic configuration, the computing device 500 may include at least one processing unit 502 and a system memory 504. The processing unit(s) (e.g., processors) may be referred to as a processing system. Depending on the configuration and type of computing device, the system memory 504 may include volatile storage (e.g., random access memory), non-volatile storage (e.g., read-only memory), flash memory, or any combination of such memories. The system memory 504 may include an operating system 505 and one or more program modules 506 suitable for running software applications 550, such as a shared SERP function 551, to implement one or more of the systems or methods described above.

The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionalities. For example, the computing device 500 may also include additional data storage devices (which may be removable and/or non-removable), such as, for example, magnetic disks, optical disks, or tape. Such additional storage is illustrated in FIG. 5 by a removable storage device(s) 509 and a non-removable storage device(s) 510.

As stated above, a number of program modules and data files may be stored in the system memory 504. While executing on the processing unit 502, the program modules 506 may perform processes including one or more of the operations of the method(s) as illustrated in FIGS. 4A-4C, or one or more operations of the system(s) and/or apparatus(es) as described with respect to FIGS. 1-3B, or the like. Other program modules that may be used in accordance with examples of the present disclosure may include applications such as electronic mail and contacts applications, word processing applications, spreadsheet applications, database applications, slide presentation applications, drawing or computer-aided application programs, artificial intelligence ("AI") applications and machine learning ("ML") modules on cloud-based systems, etc.

Furthermore, examples of the present disclosure may be practiced in an electrical circuit including discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip ("SOC") where each or many of the components illustrated in FIG. 5 may be integrated onto a single integrated circuit. Such an SOC device may include one or more processing units, graphics units, communications units, system virtualization units and various application functionalities all of which may be integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (or chip). Examples of the present disclosure may also be practiced using other technologies capable of performing logical operations such as, for example, AND, OR, and NOT, including, but not limited to, mechanical, optical, fluidic, and/or quantum technologies.

The computing device 500 may also have one or more input devices 512 such as a keyboard, a mouse, a pen, a sound input device, and/or a touch input device, etc. The output device(s) 514 such as a display, speakers, and/or a printer, etc. may also be included. The aforementioned devices are examples and others may be used. The computing device 500 may include one or more communication connections 516 allowing communications with other computing devices 518. Examples of suitable communication connections 516 include, but are not limited to, radio frequency ("RF") transmitter, receiver, and/or transceiver circuitry; universal serial bus ("USB"), parallel, and/or serial ports; and/or the like.

The term "computer readable media" as used herein may include computer storage media. Computer storage media may include volatile and nonvolatile, and/or removable and non-removable, media that may be implemented in any method or technology for storage of information, such as computer readable instructions, data structures, or program modules. The system memory 504, the removable storage device 509, and the non-removable storage device 510 are all computer storage media examples (i.e., memory storage). Computer storage media may include random access memory ("RAM"), read-only memory ("ROM"), electrically erasable programmable read-only memory ("EE-PROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media may be non-transitory and tangible, and computer storage media do not include a carrier wave or other propagated data signal.

Communication media may be embodied by computer readable instructions, data structures, program modules, or other data in a modulated data signal, such as a carrier wave or other transport mechanism, and may include any information delivery media. The term "modulated data signal" may describe a signal that has one or more characteristics that are set or changed in such a manner as to encode information in the signal. By way of example, and not limitation, communication media may include wired media such as a wired network or direct-wired connection, and wireless media such as acoustic, RF, infrared, and other wireless media.

As should be appreciated from the foregoing, the present technology provides multiple technical benefits and solutions to technical problems. For instance, implementing multiple products with their corresponding search utilities generally raises multiple technical problems. For instance, one technical problem includes different and inconsistent search functions or search UXs across the products (e.g., host apps). This difference compromises ease and efficiency in terms of use of the search functions using the multiple products. Another technical problem includes the same queries leading to different results in the search utilities of the multiple products, due to different backend calling and specific logic on UXs of the search utilities. The present technology provides a shared SERP system that establishes and/or maintains a consistent tenant-wide search experience across multiple products oriented to various applications. The consistent tenant-wide search experience provides coherent search data and search UX in the SERPs across the multiple products oriented to various applications. In an example, the coherent search data and search UX in the SERPs also provides for better integration of work-based searches and web-based searches. The shared SERP system also enables coherence in terms of triggering, relevance, ranking, user flow, and content types.

In an aspect, the technology relates to a method that includes receiving, by a shared SERP system and from a first search utility among a plurality of search utilities, a user search query. The plurality of search utilities is associated with corresponding apps or platforms that are different from each other. The method further includes providing, by a router and to a first query builder among one or more query builders of the shared SERP system, the user search query and location information. The location information describes a view of a first SERP, the view being derived from a current URL corresponding to the first SERP and being a representation of a location to which a user can navigate. The method further includes constructing, by the first query builder, a query request corresponding to the user search query, based on the provided user search query and location information; and executing, by a first query executor among one or more query executors of the shared SERP system, the query request to produce search results. The method further includes rendering, by a component renderer of the shared SERP system, one or more UX components within the first SERP, based on the search results.

In some examples, receiving the user search query includes receiving, by the shared SERP system and from the first search utility, the user search query via an API between the shared SERP system and a first app corresponding to the first search utility. In some cases, the method further includes mapping, by the router of the shared SERP system and using a location mapper, an app-specific location associated with the first app to a search location corresponding to the location information describing the view of the first SERP. In some instances, the method further includes updating a router state history system with a current state of the router based on other components of the shared SERP system; updating the current state of the router based on updates to the router state history system from the first app; and re-rendering, by the component renderer, the one or more UX components within the first SERP based on the updated current state of the router. In examples, rendering the one or more UX components within the first SERP is further based on at least one of a current state of the router or one or more navigable links to other locations related to the search results.

In examples, the method further includes receiving, by the router of the shared SERP system and from the first search utility, configuration data that defines at least one search vertical among a plurality of search verticals. The plurality of search verticals includes tabs on a SERP that show results of a specific type of result among a plurality of types of results or results from selected sources in response to the user search query. In some cases, the plurality of search utilities each has its own plurality of search verticals that is different from a plurality of search verticals of each of the other plurality of search utilities. In some instances, the query request further incorporates at least one of a conversation ID or a logical ID each of which is accessible by the query builder. The conversation ID is used to identify a conversation containing a set of search queries in a session, and the logical ID is used to identify a logical category by which the at least one search vertical is created. In some examples, rendering the one or more UX components within the first SERP includes rendering a mainline region, pagination, and a context region. The mainline displays the search results, while pagination displays the search results across multiple pages, and the context region displays at least one of content related to the search results or one or more search verticals among the plurality of search verticals. In some instances, rendering the one or more UX components within the first SERP further includes rendering a results cluster region that displays a collection of information associated with the search results, the collection of information being displayed in one or more forms.

In some examples, the method further includes storing, by a query cache of the shared SERP system, the search results. The query cache is configured to serve a plurality of different query types. Each query type is associated with a corresponding query builder among the one or more query builders and with a corresponding query executor among the one or more query executors. In some instances, the query executor and the query cache are configured to access, or be accessed by, a tenant-wide information system within a computing environment. The shared SERP system is configured to provide a consistent and coherent search experience across the plurality of search utilities for the tenant-wide information system, by conforming at least one of UX components, UX component layouts, metadata, or user flows when rendering UX components in SERPs for the plurality of search utilities for the tenant-wide information system. In some cases, the shared SERP system is configured to be embeddable within each of the plurality of apps and to adapt to UX components of an app within which it is embedded.

In another aspect, the technology relates to a shared SERP system that includes a router configured to provide, to a first query builder among one or more query builders, user search queries that are received from one or more search utilities among a plurality of search utilities and to provide location information describing a view of each of one or more SERPs. The plurality of search utilities is associated with corresponding apps or platforms that are different from each other. The view of each SERP is derived from a current URL corresponding to said each SERP and is a representation of a location to which a user can navigate. The SERP system further includes the one or more query builders, one or more query executors, and a component renderer. Each query builder is configured to construct query requests corresponding to the user search queries, based on the corresponding provided user search queries and location information. Each query executor is configured to execute the query requests to produce search results. The component renderer is configured to render one or more UX components within the first SERP, based on the search results and at least one of a current state of the router or one or more navigable links to other locations related to the search results.

In some examples, the router is further configured to map, using a location mapper, an app-specific location associated with a first app to a search location corresponding to the location information describing the view of a first SERP. In some instances, the SERP further includes a query cache configured to store the search results, and configured to serve a plurality of different query types. Each query type is associated with a corresponding query builder among the one or more query builders and with a corresponding query executor among the one or more query executors. In some cases, each query executor and the query cache are configured to access, or be accessed by, a tenant-wide information system within a computing environment. The shared SERP system is configured to provide a consistent and coherent search experience across the plurality of search utilities for the tenant-wide information system, by conforming at least one of UX components, UX component layouts, metadata, or user flows when rendering UX components in SERPs for the plurality of search utilities for the tenant-wide information system.

In yet another aspect, the technology relates to a method that includes receiving, by a shared SERP system and from a first search utility among a plurality of search utilities, a user search query, the plurality of search utilities being associated with corresponding apps or platforms that are different from each other. The method further includes receiving, by a router of the shared SERP system and from the first search utility, configuration data that defines at least one search vertical among a plurality of search verticals. The plurality of search verticals includes tabs on a SERP that show results of a specific type of result among a plurality of types of results or results from selected sources in response to the user search query. The method further includes providing, by the router and to a first query builder among one or more query builders of the shared SERP system, the user search query and location information. The location information describes a view of a first SERP, the view being derived from a current URL corresponding to the first SERP and being a representation of a location to which a user can navigate. The method further includes constructing, by the first query builder, a query request corresponding to the user search query, based on the provided user search query and location information. The query request further incorporates at least one of a conversation ID or a logical ID each of which is accessible by the query builder. The conversation ID is used to identify a conversation containing a set of search queries in a session, and the logical ID is used to identify a logical category by which the at least one search vertical is created. The method further includes executing, by a first query executor among one or more query executors of the shared SERP system, the query request to produce search results; storing, by a query cache of the shared SERP system, the search results. The method further includes rendering, by a component renderer of the shared SERP system, one or more UX components within the first SERP, based on the search results and at least one of a current state of the router or one or more navigable links to other locations related to the search results.

In some examples, the plurality of search utilities each has its own plurality of search verticals that is different from a plurality of search verticals of each of the other plurality of search utilities. In some cases, rendering the one or more UX components within the first SERP includes rendering a mainline region, pagination, a context region, and a results cluster region. The mainline displays the search results, pagination displays the search results across multiple pages, the context region displays at least one of content related to the search results or one or more search verticals among the plurality of search verticals, and the results cluster region displays a collection of information associated with the search results. The collection of information is displayed in one or more forms.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n" may be used, where n denotes any suitable integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05$a$-X05$n$, the integer value of n in X05$n$ may be the same or different from the integer value of n in X10$n$ for component #2 X10$a$-X10$n$, and so on.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

In this detailed description, for the purposes of explanation, numerous specific details are set forth to provide a thorough understanding of the described embodiments. It will be apparent to one skilled in the art, however, that other embodiments of the present invention may be practiced without some of these specific details. In other instances, certain structures and devices are shown in block diagram form. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the detailed description does not limit the technology, but instead, the proper scope of the technology is defined by the appended claims. Examples may take the form of a hardware implementation, or an entirely software implementation, or an implementation combining software and hardware aspects. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features. The detailed description is, therefore, not to be taken in a limiting sense.

Aspects of the present invention, for example, are described above with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

What is claimed is:

1. A method, comprising:

receiving, by a shared search engine results page ("SERP") system and from a first search utility among a plurality of search utilities, a user search query, the plurality of search utilities being associated with corresponding software applications ("apps") or platforms that are different from each other;

providing, by a router and to a first query builder among one or more query builders of the shared SERP system, the user search query and location information, the location information describes a view of a first SERP and indicates a content type for content to be searched based on the user search query, the view being derived from a current uniform resource locator ("URL") corresponding to the first SERP and being a representation of a location to which a user can navigate;

constructing, by the first query builder, a query request corresponding to the user search query, based on the provided user search query and location information;

executing, by a first query executor among one or more query executors of the shared SERP system, the query request to produce search results; and rendering, by a component renderer of the shared SERP system, one or more user experience ("UX") components within the first SERP, based on the search results.

2. The method of claim 1, wherein receiving the user search query comprises receiving, by the shared SERP system and from the first search utility, the user search query via an application programming interface ("API") between the shared SERP system and a first app corresponding to the first search utility.

3. The method of claim 2, further comprising:
mapping, by the router of the shared SERP system and using a location mapper, an app-specific location associated with the first app to a search location corresponding to the location information describing the view of the first SERP.

4. The method of claim 3, further comprising:
updating a router state history system with a current state of the router based on other components of the shared SERP system;
updating the current state of the router based on updates to the router state history system from the first app; and
re-rendering, by the component renderer, the one or more UX components within the first SERP based on the updated current state of the router.

5. The method of claim 1, wherein rendering the one or more UX components within the first SERP is further based on at least one of a current state of the router or one or more navigable links to other locations related to the search results.

6. The method of claim 1, further comprising:
receiving, by the router of the shared SERP system and from the first search utility, configuration data that defines at least one search vertical among a plurality of search verticals, wherein the plurality of search verticals includes tabs on a SERP that show results of a specific type of result among a plurality of types of results or results from selected sources in response to the user search query.

7. The method of claim 6, wherein the plurality of search utilities each has its own plurality of search verticals that is different from a plurality of search verticals of each of the other plurality of search utilities.

8. The method of claim 6, wherein the query request further incorporates at least one of a conversation identifier ("ID") or a logical ID each of which is accessible by the query builder, the conversation ID being used to identify a conversation containing a set of search queries in a session, and the logical ID being used to identify a logical category by which the at least one search vertical is created.

9. The method of claim 6, wherein rendering the one or more UX components within the first SERP comprises rendering a mainline region, pagination, and a context region, the mainline displaying the search results, pagination displaying the search results across multiple pages, and the context region displaying at least one of content related to the search results or one or more search verticals among the plurality of search verticals.

10. The method of claim 9, wherein rendering the one or more UX components within the first SERP further comprises rendering a results cluster region that displays a collection of information associated with the search results, the collection of information being displayed in one or more forms.

11. The method of claim 1, further comprising:
storing, by a query cache of the shared SERP system, the search results, wherein the query cache is configured to serve a plurality of different query types, wherein each query type is associated with a corresponding query builder among the one or more query builders and with a corresponding query executor among the one or more query executors.

12. The method of claim 11, wherein the query executor and the query cache are configured to access, or be accessed by, a tenant-wide information system within a computing environment, wherein the shared SERP system is configured to provide a consistent and coherent search experience across the plurality of search utilities for the tenant-wide information system, by conforming at least one of UX components, UX component layouts, metadata, or user flows when rendering UX components in SERPs for the plurality of search utilities for the tenant-wide information system.

13. The method of claim 1, wherein the shared SERP system is configured to be embeddable within each of the plurality of apps and to adapt to UX components of an app within which it is embedded.

14. A method, comprising:
receiving, by a shared search engine results page ("SERP") system and from a first search utility among a plurality of search utilities, a user search query, the plurality of search utilities being associated with corresponding software applications ("apps") or platforms that are different from each other;
receiving, by a router of the shared SERP system and from the first search utility, configuration data that defines at least one search vertical among a plurality of search verticals, wherein the plurality of search verticals includes tabs on a SERP that show results of a specific type of result among a plurality of types of results or results from selected sources in response to the user search query;
providing, by the router and to a first query builder among one or more query builders of the shared SERP system, the user search query and location information, the location information describing a view of a first SERP and indicates a content type for content to be searched based on the user search query, the view being derived from a current uniform resource locator ("URL") corresponding to the first SERP and being a representation of a location to which a user can navigate;
constructing, by the first query builder, a query request corresponding to the user search query, based on the provided user search query and location information, wherein the query request further incorporates at least one of a conversation identifier ("ID") or a logical ID each of which is accessible by the query builder, the conversation ID being used to identify a conversation containing a set of search queries in a session, and the logical ID being used to identify a logical category by which the at least one search vertical is created;
executing, by a first query executor among one or more query executors of the shared SERP system, the query request to produce search results;
storing, by a query cache of the shared SERP system, the search results; and
rendering, by a component renderer of the shared SERP system, one or more user experience ("UX") components within the first SERP, based on the search results and at least one of a current state of the router or one or more navigable links to other locations related to the search results.

15. The method of claim 14, wherein the plurality of search utilities each has its own plurality of search verticals that is different from a plurality of search verticals of each of the other plurality of search utilities.

16. The method of claim 14, wherein rendering the one or more UX components within the first SERP comprises rendering a mainline region, pagination, a context region, and a results cluster region, the mainline displaying the search results, pagination displaying the search results across multiple pages, the context region displaying at least one of content related to the search results or one or more search verticals among the plurality of search verticals, and the results cluster region displaying a collection of information associated with the search results, the collection of information being displayed in one or more forms.

17. A system comprising:

a processor; and memory comprising computer executable instructions that, when executed, perform operations comprising:

receiving, by a shared search engine results page ("SERP") system and from a first search utility among a plurality of search utilities, a user search query, the plurality of search utilities being associated with corresponding software applications ("apps") or platforms that are different from each other;

providing, by a router and to a first query builder among one or more query builders of the shared SERP system, the user search query and location information, the location information describes a view of a first SERP and indicates a content type for content to be searched based on the user search query, the view being derived from a current uniform resource locator ("URL") corresponding to the first SERP and being a representation of a location to which a user can navigate;

constructing, by the first query builder, a query request corresponding to the user search query, based on the provided user search query and location information;

executing, by a first query executor among one or more query executors of the shared SERP system, the query request to produce search results; and rendering, by a component renderer of the shared SERP system, one or more user experience ("UX") components within the first SERP, based on the search results.

18. The system of claim 17, wherein the one or more UX components includes content of the content type indicated by the location information.

19. The system of claim 17, wherein receiving the user search query comprises receiving, by the shared SERP system and from the first search utility, the user search query via an application programming interface ("API") between the shared SERP system and a first app corresponding to the first search utility.

20. The system of claim 17, further comprising:

receiving, by the router of the shared SERP system and from the first search utility, configuration data that defines at least one search vertical among a plurality of search verticals, wherein each of the plurality of search verticals corresponds to a respective content type.

* * * * *